(12) United States Patent
Waxman et al.

(10) Patent No.: US 10,806,156 B2
(45) Date of Patent: Oct. 20, 2020

(54) COMPOSITIONS AND METHODS FOR CONTROLLING SPROUTING OF STORED POTATOES USING ALLYL ISOTHIOCYANATE

(71) Applicant: 1,4Group, Inc., Meridian, ID (US)

(72) Inventors: Addie Waxman, Meridian, ID (US); John M. Forsythe, Meridian, ID (US)

(*) Notice: Subject to any disclaimer, the term of this patent is extended or adjusted under 35 U.S.C. 154(b) by 501 days.

(21) Appl. No.: 15/439,853

(22) Filed: Feb. 22, 2017

(65) Prior Publication Data
US 2017/0238570 A1 Aug. 24, 2017

Related U.S. Application Data

(60) Provisional application No. 62/298,320, filed on Feb. 22, 2016.

(51) Int. Cl.
A23B 7/154 (2006.01)
A23L 19/12 (2016.01)

(52) U.S. Cl.
CPC .............. *A23B 7/154* (2013.01); *A23L 19/12* (2016.08); *A23V 2002/00* (2013.01)

(58) Field of Classification Search
CPC ...................................................... A23B 7/154
USPC ......................................................... 504/101
See application file for complete search history.

(56) References Cited

U.S. PATENT DOCUMENTS

| | | | | |
|---|---|---|---|---|
| 5,436,226 | A | * | 7/1995 | Lulai ...................... A01N 37/42 426/268 |
| 8,450,244 | B2 | | 5/2013 | Robinson |
| 2007/0290062 | A1 | * | 12/2007 | Forsythe ................. A23B 7/152 239/8 |
| 2018/0125077 | A1 | | 5/2018 | Morra et al. |

OTHER PUBLICATIONS

Kenji Isshiki, Keiko Tokuoka, Risaburo Mod & Saiko Chiba (1992) Preliminary Examination of Allyl Isothiocyanate Vapor for Food Preservation, Bioscience, Biotechnology, and Biochemistry, 56:9, 1476-1477.*
J. S. Hemingway et al. ,Nature Publishing Group, No. 4806, Dec. 9, 1961, p. 993.*
Pesticide Research Institute for the USDA ,Allyl Isothiocyanate Technical Evaluation Report, Oct. 3, 2016.*
Pavel Rauch Rauch, Pavel (Penetration of 35S-allylisothiocyanate into potato tuber, Sbornik Vysoke Skoly Chemicko-Technologicke v Praze, E: Potraviny / Sb. Vys. Sk. Chem.-Technol. Praze, Potraviny, vol. E52, pp. 179-191, 1981).*
Allyl Isothiocyanate Crops; Technical Evaluation Report Compiled by Pesticide Research Institute for the USDA National Organic Program; Oct. 3, 2014; 25 pgs.
Li et al.; Extraction of Allyl Isothiocyanate from Wasabi (Wasabia japonica Matsum) Using Supercritical Carbon Dioxide; Food Sci. Biotechnol. 19(2): 405-410 (2010).

* cited by examiner

*Primary Examiner* — Johann R Richter
*Assistant Examiner* — Courtney A Brown
(74) *Attorney, Agent, or Firm* — Magleby, Cataxinos & Greenwood, P.C.

(57) ABSTRACT

Compositions and methods for treating stored potatoes to inhibit the growth of sprouts, and/or to "burn" sprouts, include the use of allyl isothiocyanate ("AITC"), which may be generated from exposing a *Brassica* meal powder (i.e., a powder derived from a member of the mustard plant family) to water. The AITC generated may provided an all-natural sprout-inhibiting agent that is effective to inhibit sprouting in stored potatoes for several weeks, if not months. Alternatively, the AITC may be synthetically produced. The potatoes may be exposed to the AITC while air containing the AITC is circulated through the potato pile, after which the potato storage facility may be ventilated to expose the potatoes to fresh air. The exposure of the potatoes to AITC may be repeated.

8 Claims, No Drawings

COMPOSITIONS AND METHODS FOR CONTROLLING SPROUTING OF STORED POTATOES USING ALLYL ISOTHIOCYANATE

CROSS-REFERENCE TO RELATED APPLICATION

This application claims the benefit under 35 U.S.C. § 119(e) of U.S. Provisional Application No. 62/298,320, filed Feb. 22, 2016.

TECHNICAL FIELD

Embodiments of the present disclosure relate to compositions and methods for treating potatoes in storage with allyl isothiocyanate to control (e.g., inhibit) the growth of sprouts.

BACKGROUND

CIPC (also known as chlorpropham or isopropyl-N-(3-chlorophenyl) carbamate) has been the workhorse of the potato storage industry since its development, in the late 1960s, as the principal sprout inhibitor for treatment of stored potatoes. (See U.S. Pat. No. 3,128,170 to Plant et al., issued Apr. 7, 1964, the disclosure of which is hereby incorporated in its entirety herein by this reference.) CIPC may be applied to potatoes in the form of an aerosol, which may be formed from solid CIPC that is melted, fed to a thermofogger, and then applied to potatoes by thermofogging. (See U.S. Pat. No. 5,935,660, to Forsythe et al., issued Aug. 10, 1999, and U.S. Pat. No. 6,068,888, to Forsythe et al., issued May 30, 2000, the disclosure of each of which patents is hereby incorporated in its entirety herein by this reference). A CIPC aerosol is composed of minute crystals of CIPC, which crystals sublimate, generating a vapor that "kills" peeps or sprouts on the potatoes. Though CIPC is particularly effective as a sprout inhibitor, it is an easily detected synthetic pesticide. There is a growing trend, in the potato storage industry, to minimize the amount of CIPC or to find other sprout-inhibiting agents that are effective and usable instead of CIPC or to lessen the amount of CIPC.

Other effective sprout inhibitors that have been in use for a number of years include 1,4-dimethylnapthalene (1,4-DMN). (See U.S. Pat. No. 6,010,728 to Forsythe et al., issued Jan. 4, 2000; U.S. Pat. No. 6,310,004 to Forsythe et al., issued Oct. 30, 2001; and U.S. Pat. No. 6,375,999 to Forsythe et al., issued Apr. 23, 2002, the disclosures of each of which patents are hereby incorporated in its entirety herein by this reference.) Other sprout-inhibiting agents include volatile chemicals, i.e., chemicals that are liquid at room temperature (i.e., at about 68° F. (about 20° C.)) and that have a high vapor pressure (i.e., a vapor pressure of at least about 5 mmHg (at least about 0.67 kPa)) at temperatures below about 100° C. (about 212° F.). Such volatile sprout inhibitor chemicals include clove oil, carvone, mint oil, various types of alcohols (e.g., octanols), aldehydes and ketones, and other volatile chemicals.

Many of the known volatile sprout inhibitor chemicals may be applied to potatoes by, among other techniques, fogging. Though CIPC, when applied to potatoes by fogging, will, as discussed above, typically form minute crystals that settle on the surface of a potato, known volatile sprout inhibitor chemicals will typically, when fogged, form minute liquid droplets. Then, because of the chemical's high vapor pressure and low concentration in the headspace of a storage facility (e.g., in the airspace above a pile of stored potatoes), the volatile chemical will turn into vapor, which vapor is then circulated within the storage facility, including through the potato pile, for a period of time in an effort to obtain a good distribution of the chemical vapor around the potatoes.

Though alternatives to CIPC have been developed and used, there continues to be a trend in the potato storage industry to find alternatives that will avoid, or at least minimize, use of synthetic chemicals. However, developing all-natural compositions and methods of using all-natural compositions continues to present challenges.

BRIEF SUMMARY

Allyl isothiocyanate ("AITC"), which may be derived from plants in the mustard plant family (known in the art as "Cruciferae" or "Brassicacea") has been observed to exhibit pesticidal effects. As disclosed herein, AITC may also be an effective sprout-inhibiting agent. Furthermore, because AITC may be derived from naturally-occurring plants, AITC shows promise as an all-natural sprout-inhibiting agent.

AITC may be derived by exposing powdered mustard plant (e.g., *Brassica juncea*) material to moisture (e.g., water, water vapor). Exposing the powdered mustard plant material to the moisture initiates a chemical reaction by which AITC is released into the surrounding atmosphere. In a potato storage facility, a pile of potatoes may be exposed to the released AITC such that the AITC effectively inhibits the growth of sprouts on the stored potatoes. In some embodiments, the AITC may be effective to burn the sprouts. Therefore, an all-natural sprout-inhibiting agent may be used to effectively control sprout growth in stored potatoes.

In other embodiments, the AITC may be synthetically produced. In some such embodiments, a composition for a sprout inhibitor for treating potatoes may comprise, consist essentially of, or consist of (i.e., be "pure") AITC.

DETAILED DESCRIPTION

Compositions and methods for treating potatoes during storage with a sprout-inhibiting agent that comprises, consists essentially of, or consists of allyl isothiocyanate ("AITC") provide a potentially all-natural sprout-growth controller.

As used herein, the term "inhibiting sprouting" means and includes either or both of preventing initial emergence of peeps and sprouts and destroying (e.g., "burning") peeps and sprouts that have already emerged from a potato.

In accordance with embodiments of the present disclosure, potatoes may be exposed to a sprout-inhibiting agent comprising, consisting essentially of, or consisting of AITC that is derived from a chemical reaction between a powder of mustard plant material (e.g., *Brassica* meal powder) and water. The reaction between the powder and the water may be a finite reaction that releases the AITC.

The mustard plant material, according to embodiments herein, may be in the form of a powder or other solid form (e.g., pellets). The material may be derived from any plant material that has a significant AITC content. For example, the material may be derived from *Brassica juncea*, from horseradish, etc.

The plant material (e.g., powder) may be exposed to the water in the vicinity of the potatoes, or at a location remote from the potatoes, with the then-generated AITC circulated through the potatoes. The exposure of the plant material to the moisture (e.g., water) may be in the form of one administration of liquid water to the plant material. In other embodiments, the moisture (e.g., water) may be administered to the plant material in the form of a sequence of liquid drops, as a mist, or in another form by which the plant material comes into contact with water sufficient to initiate the chemical reaction by which AITC is generated.

Though, in some embodiments, the AITC may be generated from a plant material in the area of the potatoes, in other embodiments the AITC may have been generated, or isolated, prior to introducing the sprout-inhibiting agent to the potato storage facility. For example, AITC may be generated and collected, and then an amount of the AITC may be introduced to the potatoes in the storage facility.

As used herein "potato storage facility" means and includes warehouse-like structures configured to contain pile(s) of potatoes, and may also mean and include shipping containers or boxes in which potatoes are temporarily stored, after harvest, such as during transport to or from a storage warehouse.

As used herein "potato storage facility with ventilation" refers to a potato storage facility that is configured to allow outside air (i.e., "fresh air") to selectively be passed into and circulated throughout at least a portion of the potato storage facility holding the potatoes.

The exposure of the potatoes to the air including the AITC may be effective to inhibit sprouting in the potatoes for several weeks (e.g., at least three weeks, e.g., at least four weeks, e.g, at least seven weeks, e.g., at least eight weeks). The treatment may be repeated to continue the sprout inhibition.

An embodiment of the invention includes a composition for treating stored potatoes within a ventilated potato storage facility, the composition comprising allyl isothiocyanate. The composition may further include at least one of CIPC, DMN, or an alcohol. The composition may also include at least one of clove oil, carvone, or mint oil. In other embodiments, the composition may be a natural ingredient. In particular embodiments, the allyl isothiocyanate may be synthetic.

The composition may comprise material of a plant in the mustard plant family and, optionally, may include water. The plant in the mustard plant family may be of the *Brassica juncea* species. In particular embodiments, the composition may be in any suitable form, such as a meal powder or pellets.

The following examples serve to demonstrate the effectiveness of embodiments of the present disclosure. These examples are not to be construed as being exhaustive or exclusive as to the scope of this disclosure.

EXAMPLE 1

Three jars were prepared to include, in each jar, four pounds (4 lbs) (1.8 kg) of harvested potatoes and one gram (1 g) of *Brassica* meal (i.e., a powder from the *Brassica juncea* plant). The powder was disposed in a bottom of the jar with a wire rack thereover, and then the potatoes were added to the jar. Therefore, the potatoes were not in direct physical contact with the powder. The potatoes added to the jar were actively-sprouting Allian potatoes.

Using a pipette, 7 mL of water was added to a ventilation tube that communicated through a lid of the jar to a position just above the powder, and within the space under the wire rack. After the water was added, the respective jar, as well as the respective ventilation tube, was sealed for a period of 24 hours. At 24 hours, the ventilation tube was unsealed, and the jar was stored at 55° F. (13° C.).

A fourth jar was prepared to include another four pounds (4 lbs) (1.8 kg) of the same type of potatoes as an untreated control jar not containing the powder.

At two months following the initial treatment, it was observed that the potatoes of the treated jars exhibited less sprouting than the potatoes in the untreated control jar.

It is contemplated that the exposure of the powder (i.e., the *Brassica* meal) to the water initiated a chemical reaction by which AITC was released into the airspace of the jar. The observable difference in amount of sprouting between the powder-containing jars and the untreated control jar indicated that the AITC was effective to inhibit sprout growth, and for at least two months.

At four weeks (4 wks) after treatment, the sprout index in the treated jars and the untreated control jars was observed. Then, at eight weeks (8 wks) after treatment, the sprout index was observed again. Below, in TABLE I, are the results as observed:

TABLE I

| Treatment | 4 wks after treatment | 8 wks after treatment |
| --- | --- | --- |
| No treatment | 2.7 | 3.8 |
| 1 g powder/7 mL water/ 1.8 kg potatoes | 0.5 | 0 |

Thus, it was observed that the use of the powder, and therefore the exposure of the potatoes to AITC, was effective to show inhibited sprouting at 4 wks after treatment and to show no sprouting at 8 wks after treatment.

EXAMPLE 2

Three jars were prepared to include, in each jar, four pounds (4 lbs) (1.8 kg) of harvested potatoes of the Cecile variety.

One half of a petri dish holding an amount of *Brassica* meal powder was placed in the bottom of each jar. One jar held 1 g of the powder, one jar held 0.5 g of the powder, and one jar held 0.25 g of the powder. As with Example 1, the powder was physically isolated from the potatoes by a wire rack. Then, to each of the powder-containing jars, 7 mL of water was added to the powder in the open petri dish through a ventilation tube communicating through the lid and down toward just above the powder.

Three untreated control jars were also prepared.

The potatoes in each of the jars, both treated and untreated, were dormant (i.e., not exhibiting sprouting) when added to the jars.

After the treatment, the jars were all sealed for 24 hours, and then the ventilation tube of each jar was unsealed.

The ventilation tube of each jar was then hooked to a ventilation source, and then each jar was placed in a black room at 50° F. (10° C.) while the ventilation continued.

At seven weeks after treatment, it was observed that the potatoes in the untreated control jars exhibited actively-growing sprouts. In the jar that had had 0.25 g of the powder, sprouting was evident, but to a lesser degree than in the untreated control jars. In the jar that had had 0.5 g of the powder, sprouting appeared to have been inhibited. In the jar that had 1.0 g of the powder, sprouting appeared to be inhibited, but phytotoxicity was observed.

Thus, it was observed that 0.25 g of the powder was less effective than either the 0.5 g or the 1.0 g of the powder, but that the 1.0 g of the powder yielded phytotoxicity. This indicated that the ratio of powder to potatoes to be treated could be tailored to optimize the effectiveness of the sprout inhibition while avoiding phytotoxicity.

At three weeks (3 wks) after treatment, the sprout index in the treated jars and the untreated control jars was observed. Then, at seven weeks (7 wks) after treatment, the sprout index was observed again. Below, in TABLE II are the results as observed:

TABLE II

| Treatment | 3 wks after treatment | 7 wks after treatment |
| --- | --- | --- |
| No treatment | 7.4 | 8.3 |
| 0.25 g powder/7 mL water/ 1.8 kg potatoes | 0.3 | 1.4 |
| 0.50 g powder/7 mL water/ 1.8 kg potatoes | 0 | 0 |
| 1.00 g powder/7 mL water/ 1.8 kg potatoes | 0 | 0 |

Thus, it was observed that the use of the powder, at even the 0.25 g level, was effective to significantly reduce sprouting, compared to the untreated controls. At the 0.5 g and 1.0 g level, no sprouting was observed at both 3 wks and 7 wks after treatment.

EXPERIMENT 3

Two (2) barrels were each filled with 200 pounds (90.7 kg) of potatoes of the Allian variety. To one of the barrels was added 1 g of *Brassica* meal powder that was then exposed to 7 mL of water. The other barrel was not treated with powder. Again, the potatoes were physically isolated from the powder.

The sprout index of the potatoes was observed at the initial application of the treatment (i.e., proximate to the time when the water was added to the powder), then at four weeks (4 wks) after treatment, and at eight weeks (8 wks) after treatment.

A second treatment of the mustard extract was applied at eight weeks after the first treatment to evaluate how reapplication would inhibit sprouting. One (1) gram of the 0.898 micromole of AITC/gram was weighed into a petri dish and 7 ml of water was added. The mixture within the petri dish was laid on top of the potatoes in the barrel. The barrel was sealed with the fans running and the potatoes were treated for 24 hours and then hooked to ventilation.

One (1) month after the second treatment, the barrel was opened for examination. The treated barrel continued to show inhibition of sprouting. The average sprout index of the treated barrel was 0.7, whereas the untreated barrel had a sprout index of 2.0.

The barrel was then resealed for another two months and evaluated. The untreated barrel had a sprout index of a 12.7, whereas the untreated barrel had a sprout index of a 1.4 for the top, 3.4 for the middle, and a 2.4 for the top.

Below, in TABLE III are the results as observed:

TABLE III

| Treatment | Initial (before or at time of treatment) | 4 wks after treatment | 8 wks after treatment | 2 mos. after $2^{nd}$ treatment |
| --- | --- | --- | --- | --- |
| No treatment | 3.0 | 9.7 | 4 | 12.7 |
| 1 g powder/ 7 mL water/ 90.7 kg of potatoes | 1.6 (top of barrel) 2.2 (middle of barrel) 2.8 (bottom of barrel) | 3.0 (top of barrel) 2.8 (middle of barrel) 3.2 (bottom of barrel) | 1.1 (top of barrel) 2.6 (middle of barrel) 2.1 (bottom of barrel) | 1.4 (top of barrel) 3.4 (middle of barrel) 2.4 (bottom of barrel) |

Thus, it was observed that exposing the potatoes to the powder was effective to significantly inhibit sprouting compared to the untreated potatoes, even at 8 wks after treatment. It was further observed that a second treatment with the powder was effective to significantly inhibit sprouting compared to the untreated potatoes, even at two (2) months after the second treatment.

It was also observed, in various experiments, that exposing the treated potatoes to ventilation while they were exposed to the AITC and thereafter tended to increase the effectiveness of the treatment. That is, it was observed that circulating the air within the containers as the AITC was being generated (i.e., after the powder had been exposed to water) tended to better distribute the sprout-inhibiting agent throughout the stored potatoes, and then fresh air (without AITC) was introduced. The sprout inhibition of the AITC was nonetheless observed to be greatly improved compared to the untreated potatoes.

EXPERIMENT 4

Russet Burbank potatoes were harvested and lifted from the ground and placed into 2000 pound research boxes. The boxes were placed into research bins at 55° F. and reduced in temperature to 50° F. The potatoes suberized at 50° F. for two weeks, then the temperature was lowered to 47° F., by one degree per week.

The following treatments of the mustard extract were applied:
Untreated Control
Mustard Extract treatments with reapplication as necessary The bins were shut down for the application (i.e., no refrigeration or outside air). Humidity and fans were left on. Using a mustard extraction application machine, 190 grams of mustard extract were applied to the potatoes. The fans on the application machine continued to blow AITC from the mustard extract for three (3) hours. The machine was then turned off and pulled away from the bins. The bins were closed and sealed with the fans running for 24 hours. At 24 hours, the bins were completely turned back on with refrigeration, outside air circulations, fans, and humidity.

First application—Nov. 28, 2016: 898 micromoles of AITC, approximately 190 grams of mustard extract.

Second application—Dec. 26, 2016: 898 micromoles of AITC, approximately 190 grams of mustard extract.

The week prior to the second application, the bins experienced out of grade temperature levels due to the extreme cold of the season. All of the bins reached 60° F. for four (4) days and the pulp temperature was recorded at 60° F. Given the stressful event, the second treatment of mustard extract was applied.

Third application—Feb. 3, 2017: 1800 micromoles of AITC, approximately 400 grams of mustard extract in Bin 3 and 2700 micromoles of AITC, 800 grams of mustard extract in Bin 2.

Bin 3 inadvertently had the humidity in the "on" mode to the point that the bins were extremely wet. The potatoes within Bin 3 were brought out of the bin to release some of the moisture and fans were put onto the boxes to move fresh air through the bin. The humidity was then set at 50% to continue to remove excess moisture. However, after a week on 50% humidity, it was determined that the humidity had still remained on due to an override within the computer system. Once again, the potatoes were set out to dry. On the day after application, the humidity was set back to 85%.

Data Collection:
Monthly sprout index
Monthly rot evaluation

Results: After the First treatment, the long dormancy Russet Burbank had no signs of breaking dormancy, as expected. The sprout index and peeping percentage of the treated and untreated were both a zero.

One month after the treatment (12-28-2016), the potatoes treated with AITC had lower sprout index and peeping percentage than the untreated control. Monthly average of the treated bins remains lower than the untreated bins.

The adverse humid conditions in the treated bin contributed to natural sprouting and break of dormancy. However, there was still inhibitory effect of the AITC as shown by the lower sprout index even under non-ideal conditions.

It is contemplated that, eventually, after the treatment(s), the sprouting of the potatoes would again be exhibited. In other words, it is contemplated that AITC may be effective to inhibit sprouting or to "burn" sprouts without wholly killing the sprouting-ability of the potato.

Also, as the above examples demonstrate, exposure with AITC in combination with circulation of air and then ventilation may yield better sprout inhibiting results, and less molding, than treatments with AITC without circulation and ventilation.

It is further contemplated that AITC may be used on its own or, optionally, in combination with other naturally-derived compounds to provide an all-natural sprout-inhibiting agent and treatment method. In other embodiments, AITC may be used in combination with other sprout-inhibiting compounds, which may include synthetic compounds, (e.g., CIPC, DMN, alcohols, or any combination thereof), which combination may allow use of a lower amount of the other sprout-inhibiting compounds, such as lower amounts of synthetic sprout-inhibiting compound(s), to still yield effective sprout inhibition.

As used herein "in combination with" may include simultaneous combinations (e.g., pre-formed mixture, simultaneous or overlapping exposure) or sequential combinations.

| | | | Treated w/AITC 898 umoles/gram | | | | | | | Untreated Control | | | | | | |
|---|---|---|---|---|---|---|---|---|---|---|---|---|---|---|---|---|
| | | | Sprout Index | | | | % Peeping | | | Sprout Index | | | | % Peeping | | |
| Date | MAH | MAT | B | M | T | Avg | B | M | T | B | M | T | Avg | B | M | T |
| Nov. 28, 2016 | 3 | 0 | 0 | 0 | 0 | 0 | 0 | 0 | 0 | 0 | 0 | 0 | 0 | 0 | 0 | 0 |
| Dec. 28, 2016 | 4 | 1 | 0.2 | 0.4 | 0.2 | 0.26 | 20 | 20 | 20 | 0.2 | 0.6 | 1 | 0.6 | 30 | 50 | 70 |
| Jan. 23, 2017 | 5 | 2 | 5.3 | 3.6 | 7.7 | 5.5 | — | — | — | 2.3 | 4.1 | 13.6 | 6.7 | — | — | — |
| Feb. 3, 2017 | 6 | 3 | 3 | 5.2 | 10.3 | 6.1 | — | — | — | 1.2 | 6.2 | 17.1 | 8.2 | — | — | — |
| Feb. 20, 2017 | 6.5 | 4 | 7.2 | 17 | 28.2 | 17.4 | — | — | — | 6.6 | 22 | 29.1 | 19 | — | — | — |

In the foregoing examples, the observations of effective sprout inhibition despite exposure to fresh air is significant as an indication that AITC, derived from Brassica meal powder, may be an effective sprout-inhibiting agent in actual potato storage facilities. Many potato storage facilities circulate fresh air through a potato stack, during storage, to inhibit mold growth in the potatoes. The demonstrated efficacy of the AITC treatment, even with the circulation of the air during treatment and the ventilation of fresh air afterward indicates that AITC treatment should be an effective sprout inhibitor in actual potato storage facilities.

It was also observed that the circulation of air, during treatment, and ventilation afterwards inhibited the powder source, itself, from becoming moldy. That is, in experiments in which the storage container was not exposed to circulation and ventilation, the powder exhibited mold. Moldy powder would not likely be desired in actual storage facilities.

As the above examples demonstrate, exposing harvested potatoes, in a potato storage facility, to AITC released from Brassica meal powder exposed to water is effective to inhibit sprouting in the treated potatoes for at least several weeks (e.g., at least about eight weeks).

It is contemplated that the potatoes may be exposed to AITC again (by another treatment of Brassica meal powder being exposed to water in an environment near the stored potatoes) subsequent to the first treatment to further the sprout inhibition in the potatoes.

It is further contemplated that, following exposure of the plant material (e.g., Brassica meal powder) to the moisture (e.g., water) to generate the AITC, a by-product of the plant material may remain. The resultant plant material, which may be substantially depleted, or fully depleted, of the AITC may be useful as a component in fertilizer or soil conditioners. Therefore, the resultant plant material may be collected and used for another, useful purpose after the AITC has been generated.

While the invention may be susceptible to various modifications and alternative forms, specific embodiments have been described by way of example in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents.

What is claimed is:

1. A method of controlling sprouting in stored potatoes within a potato storage facility, the method comprising:
   exposing a powder of Brassica meal to water to generate allyl isothiocyanate in an air space proximate the stored potatoes, wherein from 800 micromoles to 1800 micromoles of allyl isothiocyanate is generated; and
   circulating the allyl isothiocyanate proximate the stored potatoes.

2. The method of claim 1, wherein exposing a powder of *Brassica* meal to water comprises exposing the powder of *Brassica* meal to one administration of liquid water.

3. The method of claim 2, wherein exposing a powder of *Brassica* meal to water comprises exposing the powder of *Brassica* meal to more than one administration of liquid water.

4. The method of claim 1, further comprising, after the circulating, ventilating the potato storage facility to expose the stored potatoes to air not comprising the allyl isothiocyanate.

5. The method of claim 1, further comprising, after the circulating:
 exposing an additional amount of the powder of *Brassica* meal to water to generate additional allyl isothiocyanate in the air space proximate the stored potatoes; and
 circulating the additional allyl isothiocyanate proximate the stored potatoes.

6. The method of claim 1, wherein the stored potatoes are exposed to multiple treatments of allyl isothiocyanate.

7. The method of claim 1, further comprising exposing the stored potatoes to at least one of isopropyl-N-(3-chlorophenyl) carbamate (CIPC), dimethylnaphthalene (DMN), or an alcohol.

8. The method of claim 1, further comprising exposing the stored potatoes at least one of clove oil, carvone, or mint oil.

* * * * *